United States Patent
Mumme

[11] Patent Number: 5,815,728
[45] Date of Patent: Sep. 29, 1998

[54] PROCESSOR ARRAY

[75] Inventor: Malcolm A. Mumme, Altadena, Calif.

[73] Assignee: Raytheon Company, El Segundo, Calif.

[21] Appl. No.: 609,585

[22] Filed: Mar. 1, 1996

[51] Int. Cl.$^6$ .................................................. G06F 13/00
[52] U.S. Cl. .............................. 395/800.01; 365/230.05; 438/128
[58] Field of Search .................... 395/800.01–800.03, 395/200, 800.32, 800.33, 800.38, 800.14–800.18; 365/232.02, 230.05, 189.02, 185.11; 438/128

[56] References Cited

U.S. PATENT DOCUMENTS

| | | | |
|---|---|---|---|
| 5,212,773 | 5/1993 | Hillis | 395/800.15 |
| 5,410,723 | 4/1995 | Schmidt et al. | 395/800.18 |
| 5,581,767 | 12/1996 | Katsuki et al. | 395/800.14 |

*Primary Examiner*—Jey Tsai
*Attorney, Agent, or Firm*—Leonard A. Alkov; William C. Schubert; Glenn H. Lenzen, Jr.

[57] ABSTRACT

A processor array 100 having an improved I/O pin utilization scheme. The inventive processor array 100 includes a first and a second set of processors 112 and 114 arranged within a chip boundary B1, with each of the processors 112 within the first set being positioned adjacent the chip boundary B1. The invention further includes an I/O arrangement for providing a plurality of electrical paths 136 across the chip boundary B1. A switch network is included for connecting each of the I/O paths 136 to a horizontal port 130 of an associated one of the processors 112 within the first set during a first clock cycle and for connecting each of the I/O paths 136 to a vertical communication port 132 of the associated processor during a second clock cycle.

1 Claim, 5 Drawing Sheets

PROCESSOR ARRAY

BACKGROUND OF THE INVENTION

1. Field of the Invention

This invention relates to electronic processor arrays. More specifically, this invention relates to methods of interconnecting subsets of such arrays disposed on separate semiconductor chips.

While the present invention is described herein with reference to a particular embodiment, it is understood that the invention is not limited thereto. Those having ordinary skill in the art and access to the teachings provided herein will recognize additional embodiments within the scope thereof.

2. Description of the Related Art

Array processors include a multiplicity of processors interconnected and programmed to perform operations on information transferred thereto. As the number of processors included within the array often exceeds the capacity of a single semiconductor chip, multiple chips are often utilized to implement large arrays.

In accordance with conventional teachings, a subarray of processors is grouped on each chip. Data is transferred between the various chips by horizontal and vertical input/output (I/O) paths. Each I/O path includes a plurality of I/O lines. For example, each horizontal path may include eight lines while each vertical path may include sixteen lines.

The maximum number of I/O lines which may be appended to each chip is constrained by the available space. In addition, the number of processors which may occupy each chip is also limited. Hence, a need in the art exists for a processor array having an improved I/O pin utilization scheme.

SUMMARY OF THE INVENTION

The aforementioned need in the art is addressed by the processor array of the present invention. The inventive processor array includes a first and a second set of processors arranged within a chip boundary, with each of the processors within the first set being positioned adjacent the chip boundary. The present invention further includes an I/O arrangement for providing a plurality of electrical paths across the chip boundary. The I/O arrangement includes a switch network for connecting each of the I/O paths to a horizontal port of an associated one of the processors within the first set during a first clock cycle and for connecting each of the I/O paths to a vertical communication port of an associated processor during a second clock cycle. Hence, the invention provides an improved I/O pin utilization scheme.

DETAILED DESCRIPTION OF THE INVENTION

Figure 1:
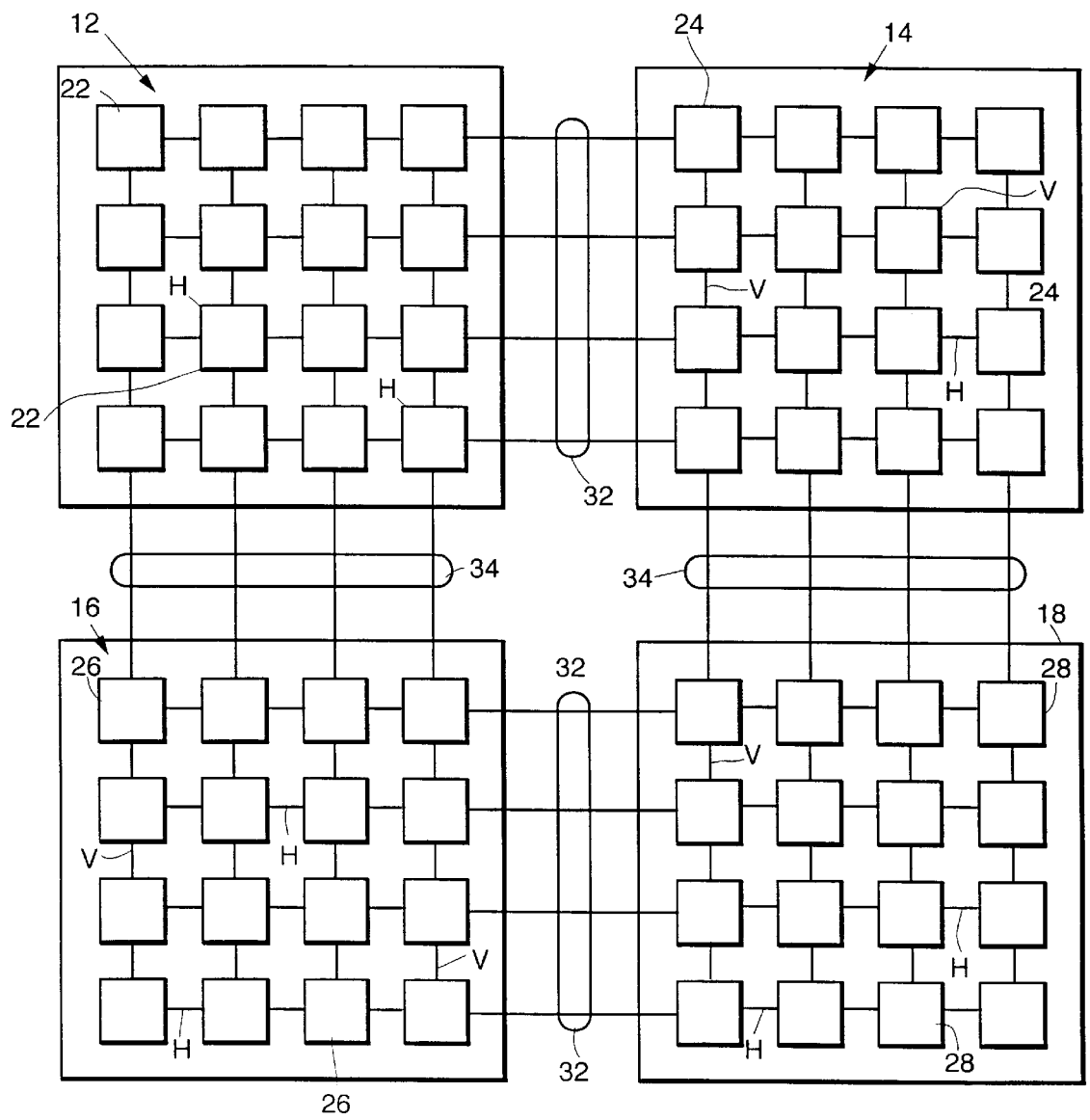
FIG. 1 is an illustrative representation of a portion of a conventional 16×16 processor array.

FIG. 1 is an illustrative representation of a portion of a conventional 16×16 processor array 10. The array 10 is implemented on sixteen semiconductor chips, with a first, a second, a third and a fourth chip 12, 14, 16 and 18, respectively, being depicted in FIG. 1.

As shown in FIG. 1, a first subarray of processors 22 is grouped on the first chip 12. Similarly, second, third, and fourth subarrays of processors 24, 26, and 28 are grouped on the second, third and fourth semiconductor chips. The processors 22 on the first chip 12 are interconnected via horizontal H and vertical V interconnection lines, as are the processors 24, 26 and 28 on the second, third, and fourth chips 14, 16, and 18 respectively.

Data is transferred between the various subarrays by horizontal and vertical input/output (I/O) paths 32 and 34. Each I/O path 32 and 34 includes a plurality of I/O lines (pins) for carrying individual bits of a data word carried by each I/O path. The array 10 is designed such that each horizontal path 32 transfers eight bit words (eight I/O lines) and each vertical path 34 transfers sixteen bit words (sixteen I/O lines). Since the maximum number of I/O lines which may be appended to each chip is constrained by the available space, the number of processors which may occupy each chip is also limited accordingly.

The processors 22, 24, 26 and 28 are operative to transfer data horizontally and vertically on alternate clock cycles. That is, data words are carried by the horizontal interconnection lines H and I/O paths 32 during a first clock cycle, and are carried by the vertical interconnection lines V and I/O paths 34 during the succeeding clock cycle. Accordingly, during the first clock cycle the vertical I/O paths 34 are not utilized, while during the succeeding clock cycle the horizontal paths 32 are not used. In practice, the sequence of usage of horizontal and vertical communications is not necessarily periodic.

A general concept of the invention is that interior processors are associated only with communication paths on the same chip. Peripheral processors communicate with processors on other chips.

Figure 2A:
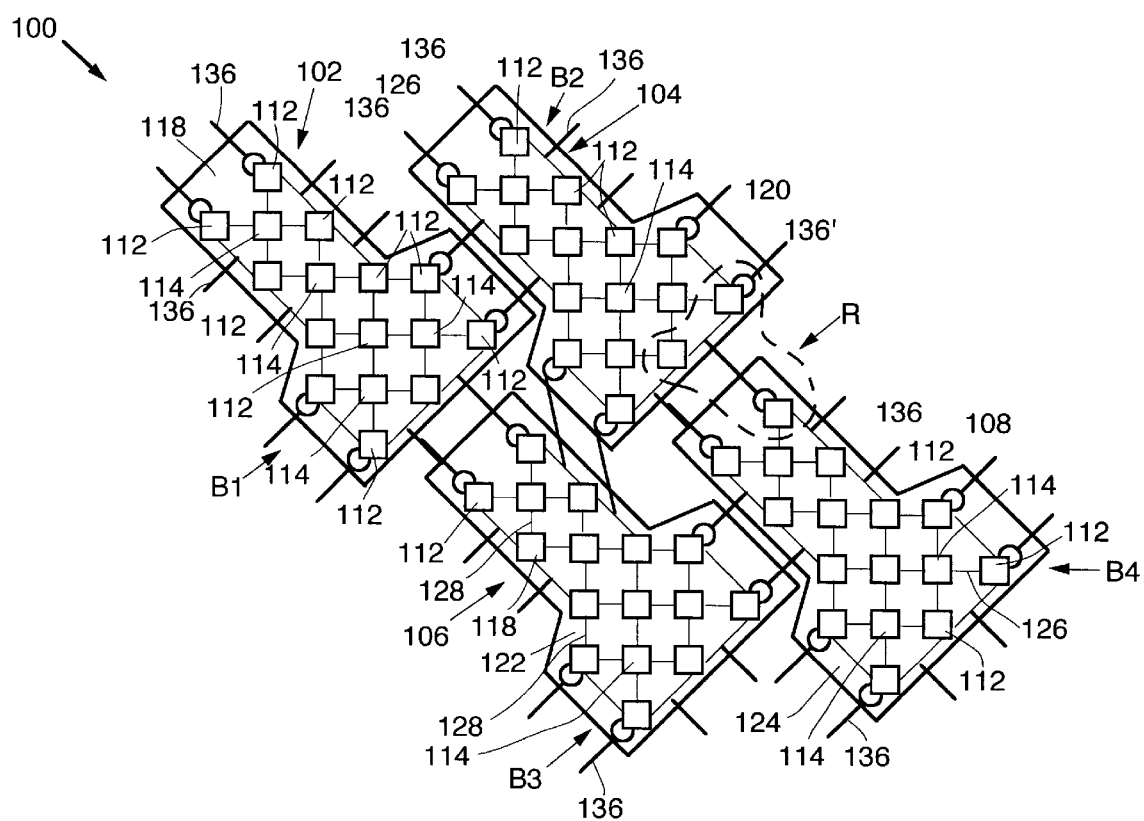
FIG. 2(a) is an illustrative representation of a preferred embodiment of a portion of the processor array of the present invention.
Figure 2B:
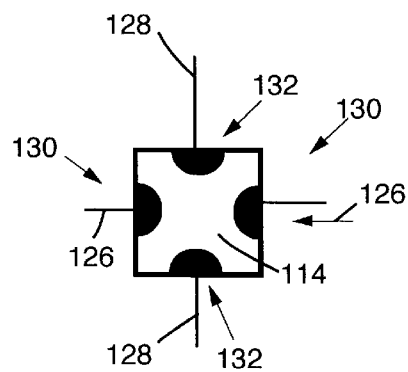
FIG. 2(b) is an illustrative representation of a peripheral processor utilized in the processor array of the present invention.

FIG. 2(a) is an illustrative representation of a preferred embodiment of a portion of the processor array 100 of the present invention. The inventive array 100 is a 16×16 array and includes first, second, third and fourth subarrays 102, 104, 106 and 108. Each of the subarrays includes a peripheral set of processors 112 and an interior set of processors 112. FIG. 2(b) is an illustrative representation of a peripheral processor 114 utilized in the processor array 100. The sequence of usage of horizontal and vertical paths is not necessarily periodic.

Returning to FIG. 2(a), the processors 112 and 114 within the first, second, third and fourth subarrays are included on first, second, third and fourth semiconductor chips 118, 120, 122, and 124, respectively, having boundary edges B1, B2, B3 and B4, respectively. As shown in FIG. 2(a), the peripheral processors 112 are arranged adjacent the boundaries B1, B2, B3, and B4 of the first, second, third and fourth chips 118, 120, 122, and 124, respectively. In contrast, each interior processor 114 is surrounded by four peripheral processors 112 and is in communication therewith via horizontal interconnection lines 126 and vertical 128 interconnection lines.

As illustrated in FIG. 2(b), each of the processors 112 and 114 includes a pair of horizontal communication ports 130 and a pair of vertical communication ports 132 which are coupled to the horizontal and vertical interconnection lines 126 and 128, respectively. The processors 112 and 114 and interconnection lines 126 and 128 are realized conventionally on each chip e.g., through ion diffusion and metallization deposition.

As illustrated in FIG. 2(a) and as discussed more fully below, the peripheral processors 112 of each chip are linked via I/O paths 136 in a manner which reduces the requisite number of such inter-chip paths relative to the number required by the conventional processor array 10 described above. That is, as shown in FIG. 1, the sixteen processors included on each chip of the conventional array 10 are accessed by sixteen I/O paths. In contrast, FIG. 2(a) reveals that each sixteen-processor chip within the array 100 may be accessed by only twelve inter-chip I/O paths 136. This configuration is made possible by the use of each I/O path during successive clock cycles to transfer data first between a pair of horizontal and then between a pair of vertical communication ports. Since the number of I/O paths on each chip is physically constrained by the pin density, the chip area required to accommodate a given number of processors is reduced in accordance with the teachings of the present invention. The limiting factor here is the number of I/O pins available in a given size package.

As with conventional processor arrays, data is transferred between the processors 112 and 114 of the array 100 alternately via the horizontal and vertical interconnection paths 126 and 128 during successive clock cycles. Information is also transferred between peripheral processors 112 on neighboring chips linked by I/O paths 136 during each clock cycle. During a first clock cycle data is transferred between the horizontal communication ports of these linked processors, while on the next clock cycle information is carried between the vertical communication ports thereof. The manner in which this transfer is effected may be explained with reference to FIG. 3a, which shows a magnified schematic view of the region of FIG. 2(a) generally indicated by R.

Figure 3A:
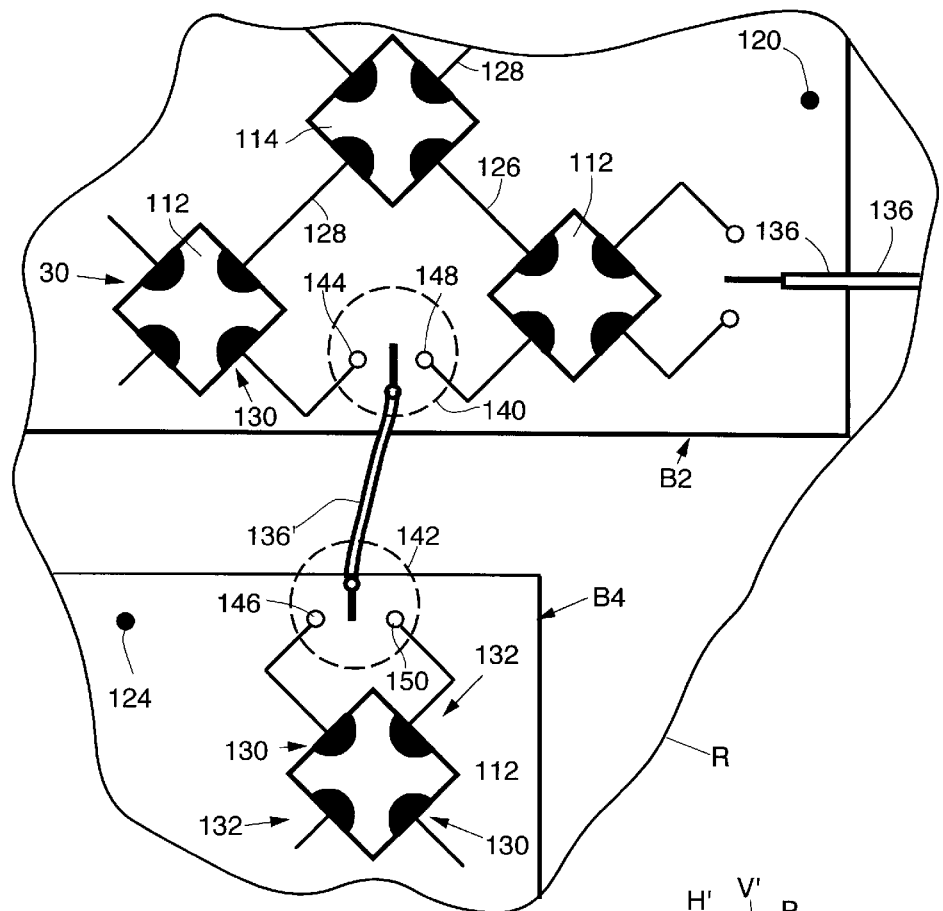
FIG. 3a shows a magnified schematic view of an I/O path terminated by first and second electronic switches realized on adjacent semiconductor chips.

As shown in FIG. 3a, the I/O path 136' is coupled to a first switch 140 realized on the second semiconductor chip 120 and to a second switch 142 realized on the fourth semiconductor chip 124. During clock cycles wherein information is transferred between horizontal communication ports, the switches 140 and 142 effect an electrical connection between first and second horizontal port terminals 144 and 146. Similarly, during clock cycles wherein information is transferred between vertical common ports the I/O path 136' is connected between first and second vertical port terminals 148 and 150. In this manner I/O path 136' conveys information between the chips 120 and 124 during each clock cycle.

FIG. 3b is a magnified schematic view of a particular implementation of the electronic switches utilized in the processor array of the present invention. If the switch control signal is implemented so that horizontal communication is encoded by logic 1 and vertical communication is encoded by logic 0, the switches 140 and 142 may be implemented as shown. Specifically, switch 140 includes an N-mos transistor 141 and a P-mos transistor 143. Each transistor is connected in series with the path 136' and a terminal of the processor array. That is, the N-mos transistor 141 is connected to first terminal 144 of the array and the P-mos transistor 143 is connected to a second terminal 148 of the array. Similarly, switch 142 is implemented with an N-mos transistor 145 and a P-mos transistor 147. A clock signal is applied to the gates of the transistors by a line 149 from a control circuit 151.

In the implementation of FIG. 3b, the path 136' includes a single line. However, the invention is not limited to the number of lines in a path. For example, each I/O path 136 may include sixteen I/O lines and may transfer a sixteen bit data word during each clock cycle. In this case, each horizontal and vertical interconnection line 126 and 128 would include a set of sixteen conductive strips. In this case, multiple pairs of pass transistors would be utilized to implement a given switch.

Figure 4:
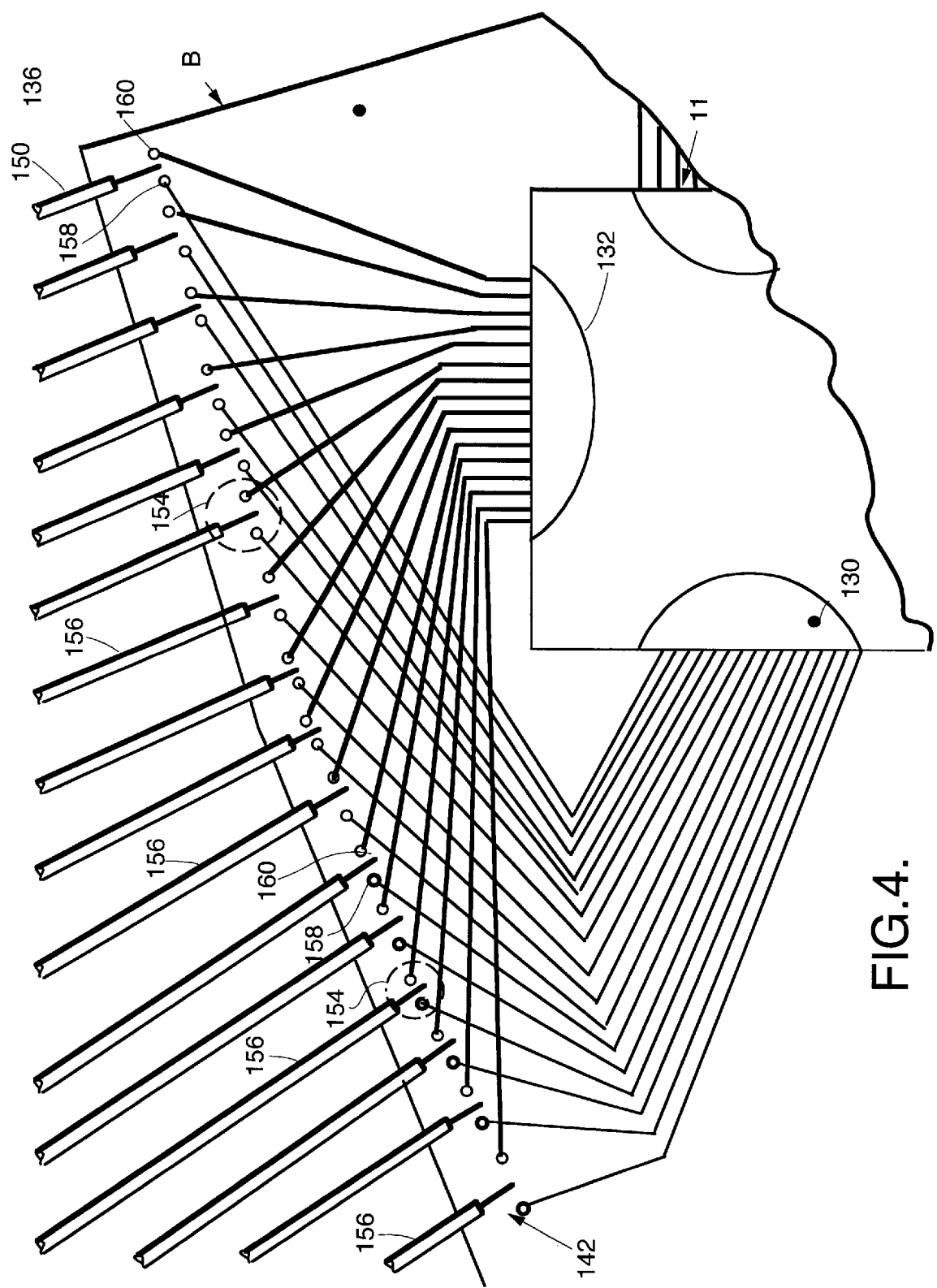
FIG. 4 shows a further magnified schematic view of the second electronic switch.

The manner in which multiple I/O lines may be connected to a switch is depicted in FIG. 4 which shows a further magnified schematic view of the second switch 142 positioned on the fourth semiconductor chip 124. As shown in FIG. 4, the switch 142 includes sixteen transistor switches 154, each of which is coupled to one of sixteen I/O lines 156. Each I/O line 156 carries a single bit of a sixteen-bit word transferred by the I/O path 136' during each clock cycle. For example, during clock cycles wherein data is transferred between horizontal communication ports 130 of the processors 112 and 114 the transistor switches 154 connect each I/O line 156 to a first transistor switch terminal 158. Similarly, during clock cycles in which information propagates between the vertical communication ports 132 the I/O lines 156 are coupled to second transistor switch terminals 160. The first and second transistor switch terminals 158 and 160 are connected to the horizontal and vertical communication ports 130 and 132, respectively.

Each of the transistor switches may be realized conventionally through ion diffusion as a pair of CMOS pass transistors. The transistor switches change state in synchrony in response to a system clock (not shown). The I/O lines 156 are bonded to bonding pads (not shown) on the surface of each chip, with the pass transistors being electrically connected to the bonding pads. The I/O lines 156 may consist of the leads (I/O pins) typically appended to semiconductor chips designed to be inserted into printed circuit boards, or may simply be realized by wire segments directly linking each chip within the array 100.

It is noted that FIG. 2(a) illustrates one method by which the teachings of the present invention may be employed to allocate the processors comprising a processor array to a plurality of semiconductor chips in order to minimize the number of interconnections therebetween. In particular, the processor allocation method of the present invention contemplates that a processor array may be grouped into subarrays having boundaries defined by an alternating series of horizontal and vertical communication ports. This principle may be illustrated through, for example, a comparison of FIGS. 1 and 2. In FIG. 1, it is seen that only vertical communication ports are adjacent an upper edge boundary U of the first chip 12 of the conventional array 10. Similarly, exclusively horizontal communication ports face a side edge boundary S of the first chip 12. In contrast, in FIG. 2(a) it is seen that the processors 112 are arranged such that horizontal and vertical communication ports are alternately adjacent the chip boundaries B1, B2, B3 and B4.

Figure 5A:
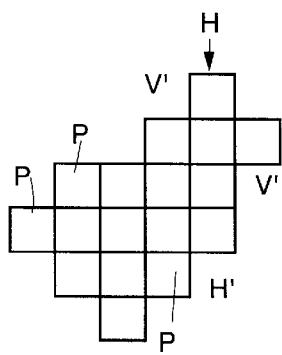
FIG. 5a illustrates one processor subarray configured in accordance with the present teachings.
Figure 5B:
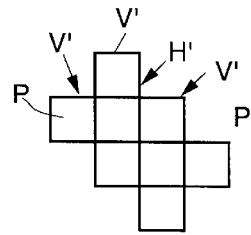
FIG. 5b illustrates an alternative processor subarray configured in accordance with the present teachings.
Figure 5C:
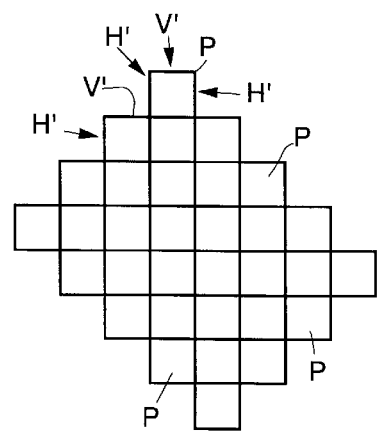
FIG. 5c illustrates another alternative processor subarray configuration in accordance with the present teachings.
Figure 3:
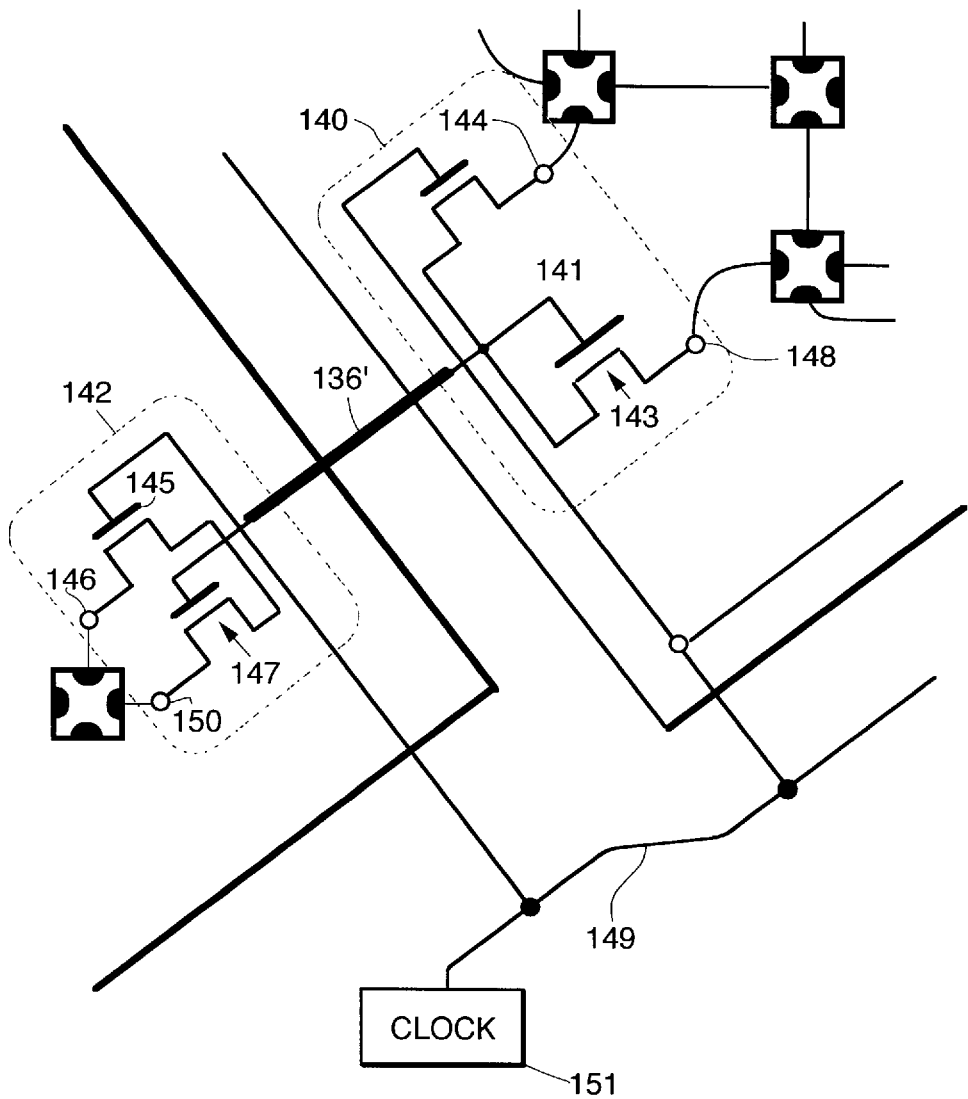
FIG. 3b is a magnified schematic view of a particular implementation of the electronic switches utilized in the processor array of the present invention.

FIG. 5a illustrates one processor subarray configuration in accordance with the processor allocation method of the present invention. FIG. 5b illustrates an alternative processor subarray configuration in accordance with the processor allocation method of the present invention. FIG. 5c illustrates yet another alternative processor subarray configuration in accordance with the processor allocation method of the present invention. The individual squares P within FIGS. 5a, 5b, and 5c denote the processors within each subarray, while the position of the horizontal and vertical communication ports are indicated by H' and V'. For example, the representation in FIG. 5a corresponds to the subarrays depicted in FIG. 2(a). FIGS. 5b and 5c represent another pair of potential subarray configurations, it being noted that the boundary of each configuration is defined by an alternating series of horizontal and vertical communication ports. While each subarray within the inventive processor array 100 is of identical shape, subarrays of differing configuration may be interconnected with I/O paths as described herein to create processor arrays within the scope of the present invention.

Thus the present invention has been described with reference to a particular embodiment in connection with a particular application. Those having ordinary skill in the art and access to the teachings of the present invention will recognize additional modifications and applications within the scope thereof. For example, the teachings of the present invention are not limited to processor arrays in which the constituent processors include only a pair of vertical and a pair of horizontal communication ports. Those skilled in the art may be aware of processors having in excess of four communication ports which may be grouped into subarrays in accordance with the teachings of the present invention. It is therefore contemplated by the appended claims to cover any and all such modifications.

Accordingly,

What is claimed is:

1. A processor array comprising:

a semiconductor chip having first and second sets of processors arranged within the boundaries thereof wherein each of said processors within said first set (i) is positioned adjacent said chip boundary and (ii) includes first and second horizontal and first and second vertical communication ports, wherein the first and second horizontal communication ports of each of said processors within said second set are linked by a horizontal interconnection line to a horizontal port of one of said processors, and wherein the first and second vertical communication ports of each of said processors within said second set are connected by a vertical interconnection line to a vertical communication port of one of said processors, and further wherein each of said processors within said second set includes means for transferring information along said horizontal interconnection lines during said first clock cycle and along said vertical interconnection lines during said second clock cycle; and means for providing a plurality of electrical paths across said chip boundary, including switch means for connecting each of said paths to a horizontal communication port of an associated one of said processors in said first set during a first clock cycle and for connecting each of said paths to a vertical communication port of said associated processor during a second clock cycle, so that the sets of porcessors transfer data horizontally and vertically in alternate clock cycles, and wherein said switch means includes a first set of switches for connecting each of said paths to the second horizontal communication port of said associated processor during said first clock cycle and a second set of switches for connecting each of said paths to the second vertical port of said associated processor during said second clock cycle;

wherein each of said electrical paths include N electrical I/O lines and wherein each of said interconnection paths include N interconnection lines, each of said I/O lines being connected to one of said switches in said first set of switches and to one of said switches in said second set of switches.

* * * * *